Dec. 18, 1962   R. C. CASSELMAN   3,068,771
SELF-DEVELOPING CAMERA WITH TIMING MEANS
Filed Dec. 27, 1960   2 Sheets-Sheet 1
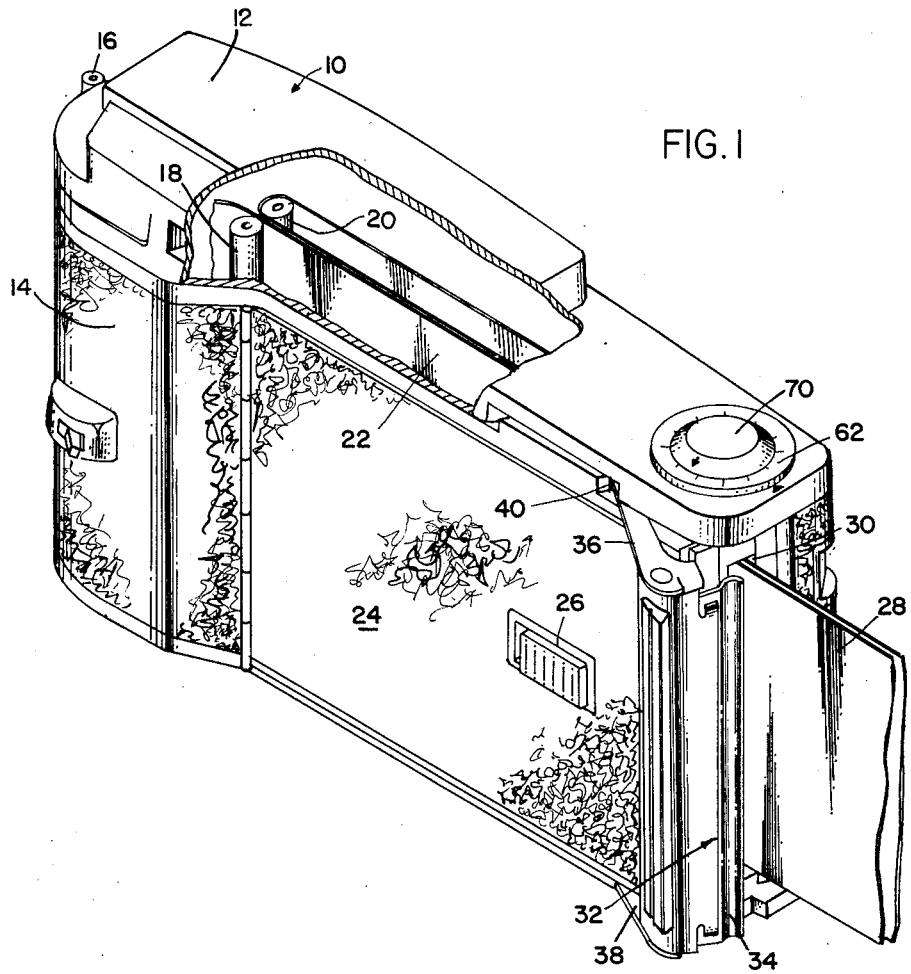
FIG. 1
FIG. 3
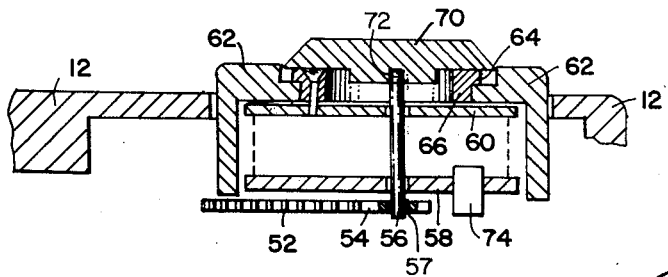
INVENTOR.
Robert C. Casselman
BY
Brown and Mikulka
Attorneys Dec. 18, 1962 R. C. CASSELMAN 3,068,771
SELF-DEVELOPING CAMERA WITH TIMING MEANS
Filed Dec. 27, 1960 2 Sheets-Sheet 2

INVENTOR.
Robert C. Casselman
BY
Brown and Mikulka
Attorneys

United States Patent Office 3,068,771
Patented Dec. 18, 1962

3,068,771
SELF-DEVELOPING CAMERA WITH
TIMING MEANS
Robert C. Casselman, Auburndale, Mass., assignor to Polaroid Corporation, Cambridge, Mass., a corporation of Delaware
Filed Dec. 27, 1960, Ser. No. 78,579
12 Claims. (Cl. 95—13)

This invention relates to photography and more specifically to self-developing cameras and timers therefor.

Photographic apparatus is known wherein a first photosensitive sheet material is exposed and thereafter processed by superposing the first sheet with a second sheet and spreading a liquid developing reagent between the two. Such apparatus generally includes means for superposing first and second sheets and spreading the developing reagent therebetween and an imbibition chamber into which the sandwich formed of the first and second sheets and the layer of developing reagent may be advanced for a predetermined processing period. The duration of this period should be accurately timed and it is also sometimes advantageous to alter the duration of this period.

This invention has as an object the provision of novel means integral to a self-developing camera which allows the user of the camera to select a time period for the development process and which also indicates the expiration of said period.

A further object is the provision of timing means within a self-developing camera which are wound and actuated automatically during the normal operations necessary with such cameras.

Another object is the provision of means for automatically winding and actuating a timing mechanism forming a part of a self-developing camera which means operate solely through mechanical interaction of camera parts, being in no way dependent on the advancement of the sheet materials through the camera.

Still another object is the provision of self-contained timing means adapted to be installed as a part of the camera at the option of the manufacturer without affecting the design of other camera parts.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a perspective view, partially in section, of a self-developing camera embodying the present invention;

FIG. 3 is a vertical sectional view of a timer embodying the features of the present invention mounted in a camera body.

Figure 2:
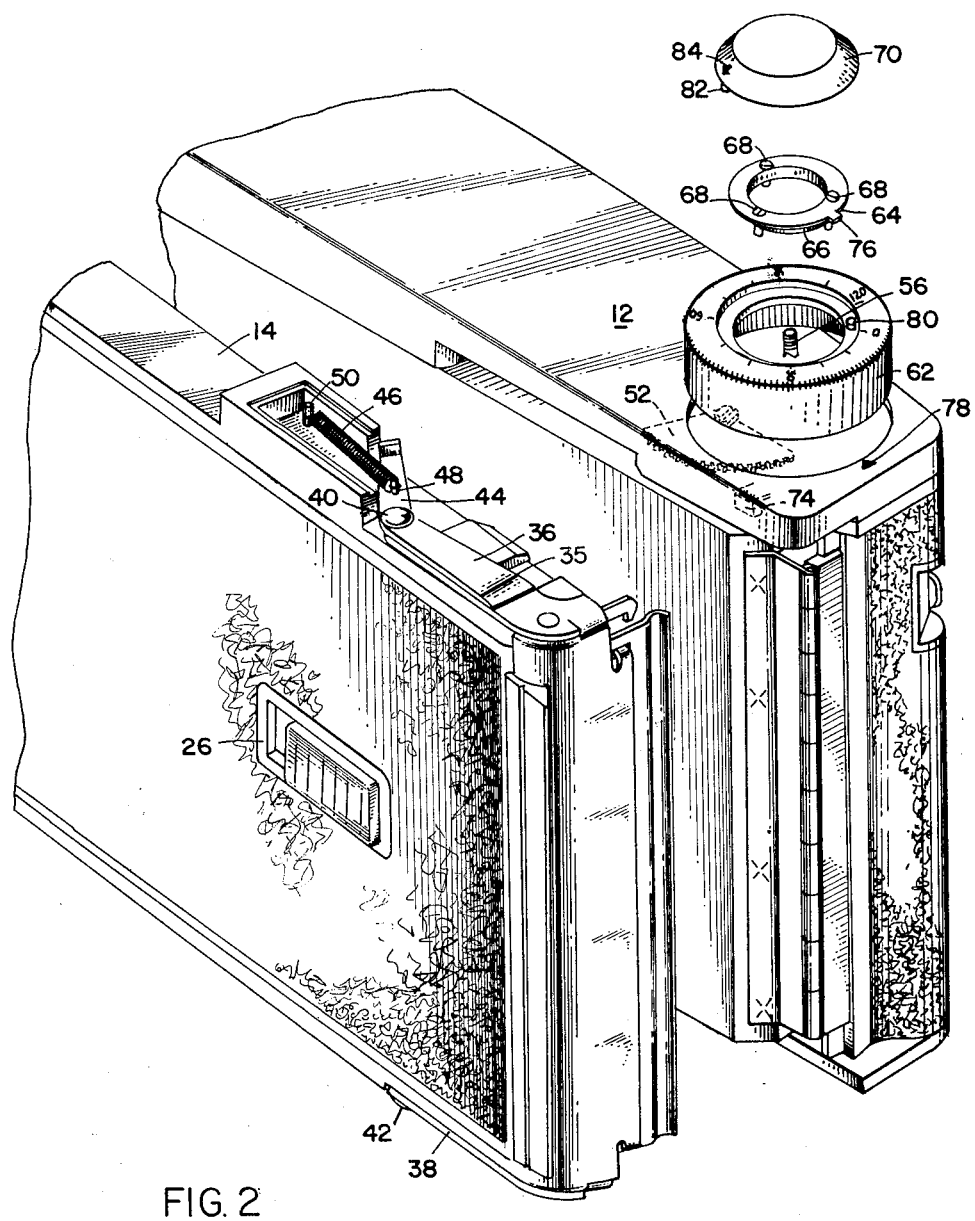
FIG. 2 is an enlarged, fragmentary, perspective view of a portion of the camera shown in FIG. 1, with some of the parts comprising the present invention shown in exploded perspective.

The invention is shown in combination with a camera of the self-developing type wherein a photosensitive negative sheet may be exposed and thereafter processed by being advanced into superposition with a positive sheet with a thin layer of developing reagent spread between the two. The camera includes a body, means for mounting supplies of the first and second sheets within the body, means for exposing an area of the first sheet, means for superposing the exposed area of the first sheet on the second sheet and spreading a layer of developing reagent therebetween and an imbibition chamber into which the sandwich comprising the sheets and layer of reagent may be advanced and wherein the sandwich is allowed to remain for a predetermined processing period. Such cameras are described in Patents No. 2,435,717, issued February 10, 1948 to Edwin H. Land and No. 2,455,111, issued November 30, 1948 to Joseph F. Carbone et al.

Referring now to the drawings, there is shown in FIG. 1 a camera enclosed by a body 10 comprising a front portion 12 and a rear portion 14 attached thereto by means of a suitable hinge 16. First and second photosensitive sheet materials are advanced into superposition as they pass between pressure-applying members, such as rollers 18 and 20, which serve to break a frangible container and spread a layer of liquid developing reagent between the sheets, thereby forming a sandwich 22 and beginning the development process. At the end of a predetermined development (or processing) period the positive print is removed through a door 24 normally held in the closed position on rear portion 14 by sliding latch 26. Sheet materials 22 are advanced through the camera by manually pulling on an expended portion 28 of the sheet materials which extends from the camera through opening 30. A severing means 32 is provided adjacent to opening 30 for tearing off expended sheet materials 28. The severing means illustrated in FIGS. 1 and 2 consist of a cutter bar 34 and arms 36 and 38 which are pivotally attached to rear portion 14 by rivets 40 and 42. For a more detailed description of the severing means illustrated in this embodiment, reference may be made to the co-pending application of Donald R. Bishop et al., Serial No. 49,636, filed August 15, 1960, entitled "Photographic Apparatus" and assigned to applicant's assignee.

Severing means 32 may be moved between open and closed positions with respect to opening 30 by rotating it about pivotal connections 40 and 42. When in the closed position, cutter bar 34 extends across and covers opening 30. In order to grasp the portion of expended sheet 28 extending through opening 30 to advance the sheet materials through the camera, the operator moves severing means 32 away from opening 30 to the open position shown in FIG. 1. When the sheet materials have been advanced, severing means 32 is again moved to the closed position, covering opening 30, and the expended sheet materials may be torn off.

Arm 36 is extended past the pivotal connection at rivet 40 to form lever 44. Spring 46 extends between pin 48 on lever 44 and pin 50 on rear portion 14. When severing means 32 is moved to the open position, spring 46 is put in tension and the spring pressure returns severing means 32 to the closed position when released. The camera and all parts thus far described may be manufactured as standard items and the assembly and operation of the camera will remain the same whether or not the timer is included. The timer may be mounted upon the camera in the form set forth above without modification of any parts.

Lever 44 contacts and rotates gear sector 52 when severing means 32 is moved from the closed to the open position. As best seen in FIG. 3, sector 52 engages and rotates gear 54, which in turn rotates shaft 56, thereby winding an energy-storing spring in a conventional interval timer (not shown) contained between plates 58 and 60 and within casing 62. The design of the timer and arrangement of parts is such that a relatively short movement of severing means 32 is sufficient to fully wind the timer. A friction clutch in the form of a rubber collar 57 within gear 54 and around shaft 56 allows further movement of severing means 32 without damage to the timer.

The upper portion of casing 62 extends above the outer surface of the camera body 10 and is inscribed with suitable indicia on its outer face. Casing 62 is held between plate 60 and flange 64 on ring 66 which is fixedly mounted on plate 60 by screws 68. Casing 62 may be manually rotated on this mounting. Shaft 56 extends through plate 60 to cover 70 which it engages by means of internal threads in a tapped hole 72 in cover 70.

Since the development process has not yet begun at the time severing means 32 is moved to the open position, it is desirable that means be provided to prevent actuation of the timer immediately upon winding. This may be accomplished by conventional means, for example, a pawl normally urged by spring means into engagement with a wheel or gear of the timer, allowing the timer to rotate only in the direction of winding, preventing actuation until the pawl is removed from engagement with the gears. Means such as member 74 may be attached to the pawl and extends from the timer in such a position as to be contacted by severing means 32 when in the closed position. When severing means 32 is moved to the open position, spring bias moves the pawl into engagement with the timer, and member 74, being attached to the pawl, is also moved outwardly into a position where it will be contacted by surface 35 of arm 36 and moved inwardly upon return of severing means 32 to the closed position. Inward movement of member 74 moves the pawl, disengaging it from the timer gear, thus actuating the timer and allowing it to run down. In the interest of simplicity the timing mechanism, being old, is not shown. Likewise, the manner of engagement of a spring-biased stationary pawl with a gear or ratchet wheel is old and it is understood that member 74 may be attached to the pawl by any suitable mechanical connection.

Flange 64 on ring 66 is extended at one point to form a stop 76, the position of which is known when cover 70 is in place by means of fiducial mark 78 on front portion 12. The inner portion of casing 62 contains a stop pin 80 opposite the zero mark on the outer surfaces of casing 62. A pin 82 is mounted on the lower surface of cover 70 opposite a fiducial mark 84 on its upper surface. When the timer is fully assembled, pin 82 on cover 70 is between stop pin 80 and stop 76 within the recessed portion of casing 62. The timer may be set for any desired time period from 0 to 120 seconds in the illustrated embodiment by manually rotating casing 62 until the number of seconds, as indicated by the indicia on casing 62, is opposite stop 76 on ring 66, as indicated by fiducial mark 78 on front portion 12. As the timer is wound, cover 70 is rotated through shaft 56 as described. When pin 82 on cover 70 contacts stop pin 80 on casing 62, a positive stop is encountered and further movement of severing means 32 will cause collar 57 to slip on shaft 56, preventing overwinding or damage to the timer. At this point, severing means 32 is in the open position, the timer is wound and engaged by a pawl, and member 74 is in a position where it will be contacted and moved by arm 36 when severing means 32 returns to the closed position. The expended portion 28 of the sheet materials may now be grasped by the operator and the sheets advanced through the camera, severing means 32 being held in the open position by the tension on the sheet materials during advancement. When the sheets have been so advanced, tension is released, severing means 32 is returned to the closed position by means of spring 46 as described, and arm 36 contacts member 74 moving the pawl out of engagement with the timer gears, thus actuating the timer. As the timer runs down, shaft 56 and cover 70 are counter-rotated until pin 82 on cover 70 contacts stop 76 on ring 66 which occurs at the time setting indicated by the indicia on casing 62. Since the unwinding of the timer is audible, the expiration of the timing period is thus audibly indicated to the operator when the timer stops. Also, a conventional audible signal device such as a bell or buzzer may be provided for audible indication of the expiration of the timing period.

It should be borne in mind that the sheet materials are shown merely to illustrate the operation of the timer in conjunction with the development process which takes place within the camera. The winding and actuation of the timer is accomplished independently of the sheet materials or their movement through the camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic camera adapted to expose and process photographic sheet materials and through which said sheet materials may be advanced, said camera comprising a housing, severing means for tearing away expended portions of said sheet materials after advancement thereof through an opening in said housing, said severing means being pivotally mounted on said housing and movable between open and closed positions with respect to said opening, and a timer mounted on said housing and including means for winding said timer in response to movement of said severing means toward said open position.

2. The camera of claim 1 wherein said severing means comprises a flat bar adjacent said opening and two arms, one at each end of said bar at 90° thereto, pivotally mounted on said housing.

3. The camera of claim 2 wherein said housing comprises hingedly connected front and rear portions and said severing means is mounted on said rear portion and said timer is mounted on said front portion.

4. The camera of claim 3 wherein said means for winding comprises rotatable means which wind said timer in response to movement of said severing means to said open position.

5. The camera of claim 4 wherein said rotatable means comprises a shaft extending from said timer, a gear coupled to said shaft and engaging a gear sector, said shaft being rotatable in response to movement of said gear sector by said severing means upon movement thereof to said open position.

6. A photographic camera adapted to expose and process photographic sheet materials and through which said sheet materials may be advanced, said camera comprising a housing, severing means for tearing away expended portions of said sheet materials after advancement thereof through an opening in said housing, said severing means comprising a flat bar adjacent said opening and two arms, one at each end of said bar at 90° thereto, pivotally mounted on said housing and movable between open and closed positions with respect to said opening, and a timer mounted on said housing, means for winding said timer in response to movement of said severing means, a pawl which engages said timer and prevents actuation thereof, and an actuating member which moves said pawl out of engagement with said timer in response to movement of said severing means.

7. The camera of claim 6 wherein said means for winding comprises a shaft extending from said timer, a gear coupled to said shaft and engaging a gear sector, said shaft being rotatable in response to movement of said gear sector by said severing means.

8. The camera of claim 7 wherein said timer is wound in response to movement of said severing means to said open position and actuated in response to movement of said severing means to said closed position.

9. The camera of claim 8 wherein said timer includes a cover portion adapted to rotate with said shaft in one direction as said timer is wound and in the opposite direction as said timer runs down, the run-down time being indicated by the position of a first fiducial mark on said cover with respect to stationary indicia.

10. The camera of claim 9 wherein said timer is enclosed by a manually rotatable, cylindrical casing partly open at the top, said cover portion being mounted in the open part of said casing, the rotation of said cover during winding and unwinding of said timer being limited by a pin on said cover rotating between a first stop on said casing and a second stop fixedly mounted with respect to said housing.

11. The camera of claim 10 wherein said casing includes indicia on its outer surface, and a second fiducial mark on said housing adjacent said second stop whereby the operator may selectively set a timing period by rotating said casing until the desired timing period, as indicated by said indicia, is opposite said second fiducial mark.

12. The camera of claim 11 wherein said gear coupled to said shaft includes a rubber collar which slips on said shaft when said gear is further rotated after said pin on said cover contacts said first stop.

References Cited in the file of this patent
UNITED STATES PATENTS
2,930,300     Danders _____ Mar. 29, 1960